Sept. 23, 1941.                C. L. PETERSON                2,256,814
                          RECAP TIRE BALANCE WHEEL
                            Filed Oct. 14, 1939              2 Sheets-Sheet 2

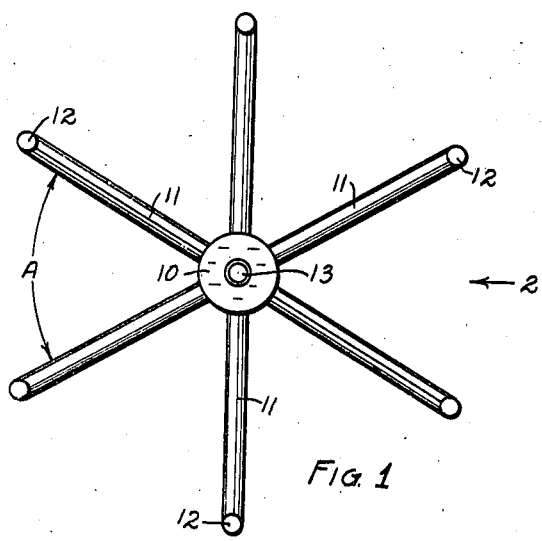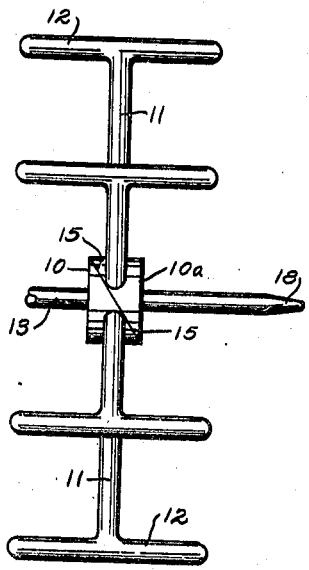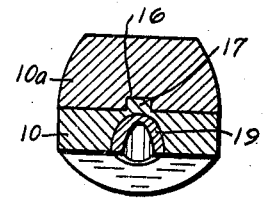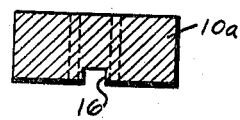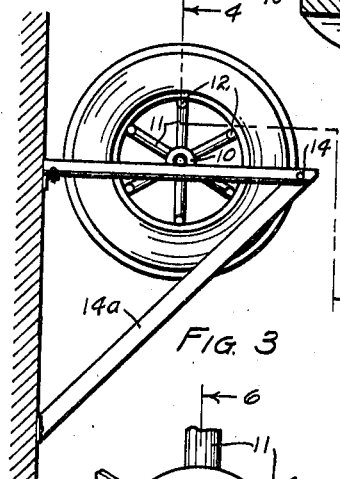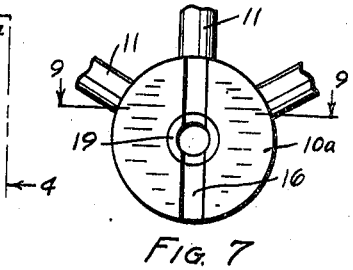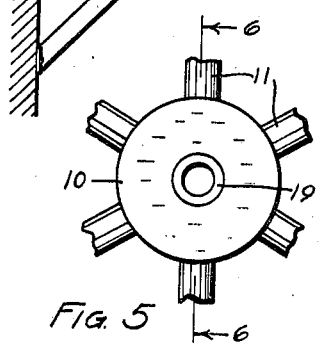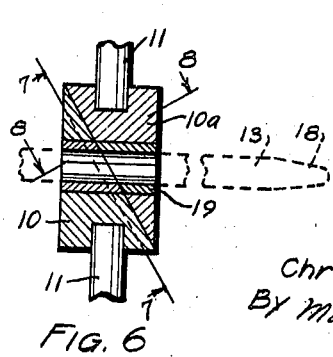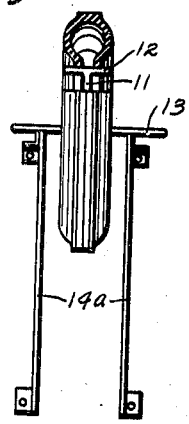

INVENTOR.
Chris L. Peterson
BY Martin E. Anderson
ATTORNEY.

Patented Sept. 23, 1941

2,256,814

UNITED STATES PATENT OFFICE 2,256,814

RECAP TIRE BALANCE WHEEL

Chris L. Peterson, Cheyenne, Wyo.

Application October 14, 1939, Serial No. 299,490

1 Claim. (Cl. 144—288)

This invention relates to improvements in tire balancing devices and has reference more particularly to a support for automobile tire casings by means of which the tire can be properly balanced for use.

It is well understood that in order to get the most satisfactory results from a pneumatic tire, it is necessary that the wheel shall be properly balanced, because if it is not, vibratory forces will be set up due to the high speed rotation of the wheel and as a result of such unbalanced forces, the tire will wear unevenly.

It is recognized that even a new tire is not completely balanced and I am aware that certain types of apparatus have been employed for determining the side of the new tire that is the heavier so that when the inner tube is inserted into the tire casing the valve stem is placed on the lighter side of the tire for the purpose of reducing the unbalanced condition.

It is now quite customary to retread tires for pleasure cars and also for trucks and during the retreading operation it frequently happens that the tire becomes unbalanced unless special precautions are taken.

It is the object of this invention to produce a simple and substantial supporting device that can be readily inserted into a tire casing for the purpose of balancing the same on spaced parallel supports in order that the material employed during the retreading operation can be so distributed that the tire will be in exact balance after it has been cured.

Having thus described, in a general way, the object of this invention, the apparatus which forms the subject of this invention will now be described in detail and for this purpose reference will be had to the accompanying drawings in which the apparatus has been illustrated in its preferred form, and in which:

Figure 1 is a side elevation of the tire supporting device;

Figure 2 is a side view thereof looking in the direction of arrow 2, Figure 1;

Figure 3 is a side elevation showing a bracket on which a tire is supported by means of the apparatus which forms the subject of this invention;

Figure 4 is a view partly in section and partly in elevation taken on line 4—4, Figure 3;

Figure 5 is a side elevation of the hub;

Figure 6 is a section taken on line 6—6, Figure 5;

Figure 7 is an elevation taken on line 7—7, Figure 6;

Figure 8 is a transverse section taken on line 8—8, Figure 6;

Figure 9 is a section through the hub taken on line 9—9, Figure 7;

Figure 10:
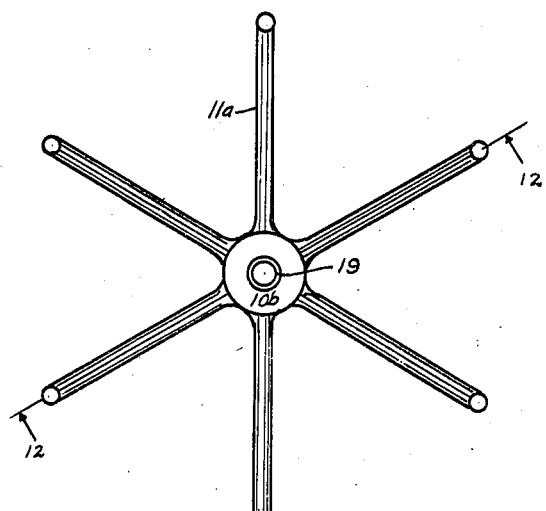
Figures 10 and 11 show respectively a side and an end elevation of a modified form of the invention.

Referring now to the drawings, reference numeral 10 designates a cylindrical hub which is preferably made from two sections that have been designated as 10 and 10a. The hub is provided with six radial spokes 11, whose ends carry transversely extending bars 12 that are attached to the outer ends of the spokes by means of electro welding or in some other similar manner. The parts are so proportioned and arranged that the outer surfaces of transverse bars 12 lie in a circle which, for the purpose of illustration, will be assumed to be 16 inches in diameter as this is the most common diameter used in connection with pleasure cars. A shaft 13 extends through the hub and holds the two parts thereof in assembled relation and also supports the device on the upper edges of the supporting angle irons 14 which are a part of the bracket which will be later described.

The spokes 11 are preferably inserted in openings in the hub and if the latter is made of iron or steel, the spokes are electro welded to hold them in adjusted position. The hub shown in the accompanying drawings is formed from a short steel cylinder which has been cut into two parts along a diagonal plane indicated by reference numeral 15 in Figure 2 and by line 7—7 in Figure 6. The inclined surface of hub member 10a is provided with a groove 16 and the cooperating member 10 has a tongue 17 that fits into the groove and interconnects the two parts of the hub so as to prevent relative rotation. When the two parts of the hub are in concentric position, the center openings will be in alignment and in position to receive the shaft 13, which is made from steel and is provided with a tapered end 18 that facilitates bringing the two parts of the hub into operative relation. It is contemplated to make the hub from cast aluminum in which case the opening for the reception of the shaft 13 is lined with a steel tube 19 which is more resistant to wear than the aluminum. Where the hub is made from iron or steel, the bushing 19 is not necessary. Since the hub is made in two parts and there are six spokes, three spokes are attached to each of the parts 10 and 10a. When the two parts of the hub are separated sufficiently to disconnect the tongue 17 from the groove 16, the two parts can be rotated relative to each other, thereby increasing the distance A between two adjacent spokes which decreases their circumference and facilitates the insertion of the device into the tire. After the device has been inserted the parts are rotated in the opposite direction until they interlock. Instead of rotating the parts relative to each other, it is sometimes desirable to remove the shaft and insert the parts separately and then position the tongue 17 in the groove and slide the parts outwardly until the openings for the shaft register and this can be facilitated by having one end of the shaft tapered as indicated at 18.

After the device has been inserted into the tire in the manner shown in Figures 3 and 4, the assembly is then positioned with the shaft 13 resting on the edges of the vertical flanges of angle irons 14. The latter are arranged so as to be parallel and are supported by diagonal braces 14a in the manner shown in Figures 3 and 4. The upper surfaces of the flanges incline slightly towards the wall. The wheel comprising the tire is now free to turn and if one portion is heavier than the other, it will move to the bottom and bring the lighter side to the top. The operator now adds a sufficient quantity of uncured tread material to the lighter side to effect a balance after which the tire is cured, or he may remove material from the heavier side by means of a buffer.

By means of this simple device it is possible to make an almost perfectly balanced retread tire with the result that it will wear evenly. By inclining the supporting flanges slightly, it is found that the test can be made more expeditiously than if they are perfectly level. The incline must be so small that only a perfectly balanced tire will roll thereon.

The construction described above has given excellent results but has some undesirable features from the point of view of the manufacturer as it is built up from several parts that must be carefully assembled.

Figure 11:
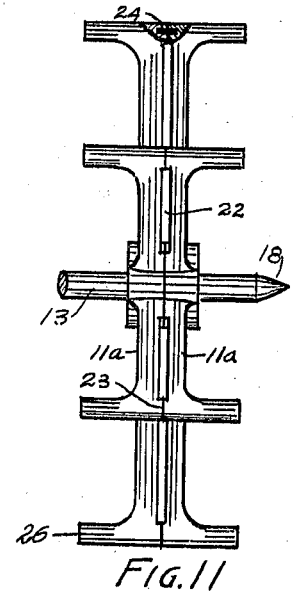
Figure 12:
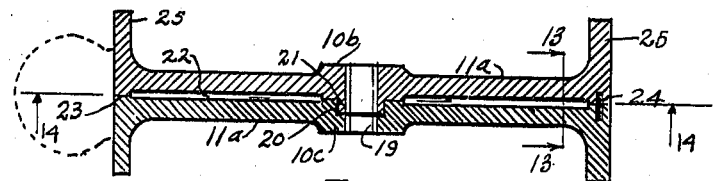
Figure 12 is a section taken on line 12—12, Figure 10.
Figure 13:
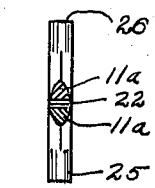
Figure 13 is a section on line 13—13, Figure 12.
Figure 14:
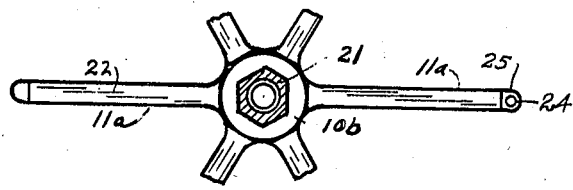
Figure 14 is a bottom plan view of the upper half, looking in the direction of arrows 14—14, Figure 12.

In Figures 10 to 14 a modification has been shown that can be cast from aluminum or other suitable metal. The construction is analogous to that above described and the changes are merely for the purpose of making it suitable for casting. The hub is formed from two parts 10b and 10c and when it is made from aluminum the hole for shaft 13 may have a hard metal bushing 19. In this embodiment the hub is separated along a plane perpendicular to its axis and part 10c is provided with a hexagonal recess 20 for the reception of a similarly shaped plug 21 for predetermining the relative rotary position of the parts. Each hub part has six spokes 11a which are so positioned that they cooperate with and supplement corresponding spokes on the other hub part. Since the spokes are cast they are made wide and of tapering cross section and complement each other. The adjacent surfaces of the spokes are spaced apart as indicated by reference numeral 22 and are in contact at their ends only as indicated by reference character 23. If found desirable the ends may be interconnected by dowel pins 24 as shown in Figure 2. Each spoke has formed integral therewith a cross bar 25 that terminates in a circular end portion 26 on which washers may be supported for balancing. The two parts are assembled on a shaft 13 having a tapered end 18.

In applying this support to a tire it is first separated and one of the parts inserted into the opening in the tire; the tire is now reversed and the other part inserted from the other side. This shaft serves to align the parts.

After the parts have been cast, they are statically balanced before they are used. Instead of a hexagonal interlock which permits the parts to be assembled in six different rotary positions, a dowel pin 24 may be substituted which prevents assembly in more than one position.

The apparatus described above and illustrated is so constructed that after it has once been balanced, it will remain balanced even if roughly handled because there are no movable parts and therefore unless it is bent or broken, it will retain its balance as long as it lasts.

The two part hub construction shown in Figures 1 to 9 is important because by this expedient the two parts can be inserted into the tire separately and then assembled on the shaft or they may be separated and rotated relative to each other while still in position on the shaft. The diagonal cooperating surfaces are believed to have certain advantages over other forms of cooperating surfaces as they permit the use of a tongue and groove interconnection that guides the parts while they are moved into operative position. It is, of course, possible to have the adjacent cooperating surfaces of specifically different shapes but in any event it is desirable that the parts shall have an equal number of spokes although this is not an essential.

From the above it will be apparent that by means of this simple apparatus a perfectly balanced retreaded tire can be made without any appreciable extra amount of labor or experience.

Having described the invention what is claimed as new is:

A device for use in balancing tires and insertible into the latter for supporting them, comprising in combination, a hub having an opening for the reception of a shaft, the hub being separated into two parts along a plane extending diagonally across the central opening, one of the adjacent surfaces having a groove and the other a cooperating tongue, said tongue and groove permitting relative movement in the direction of the groove, but preventing relative rotary movement about the axis of the central opening, each part of the hub having a plurality of radial spokes, a cross bar attached to the outer end of each spoke, the axes of the cross bars being parallel with the axes of the central opening, the outer surfaces of the cross bars being spaced the same distance from the center of the opening in the hub, the parts being statically balanced with respect to the center of the shaft receiving opening.

CHRIS L. PETERSON.